United States Patent Office.

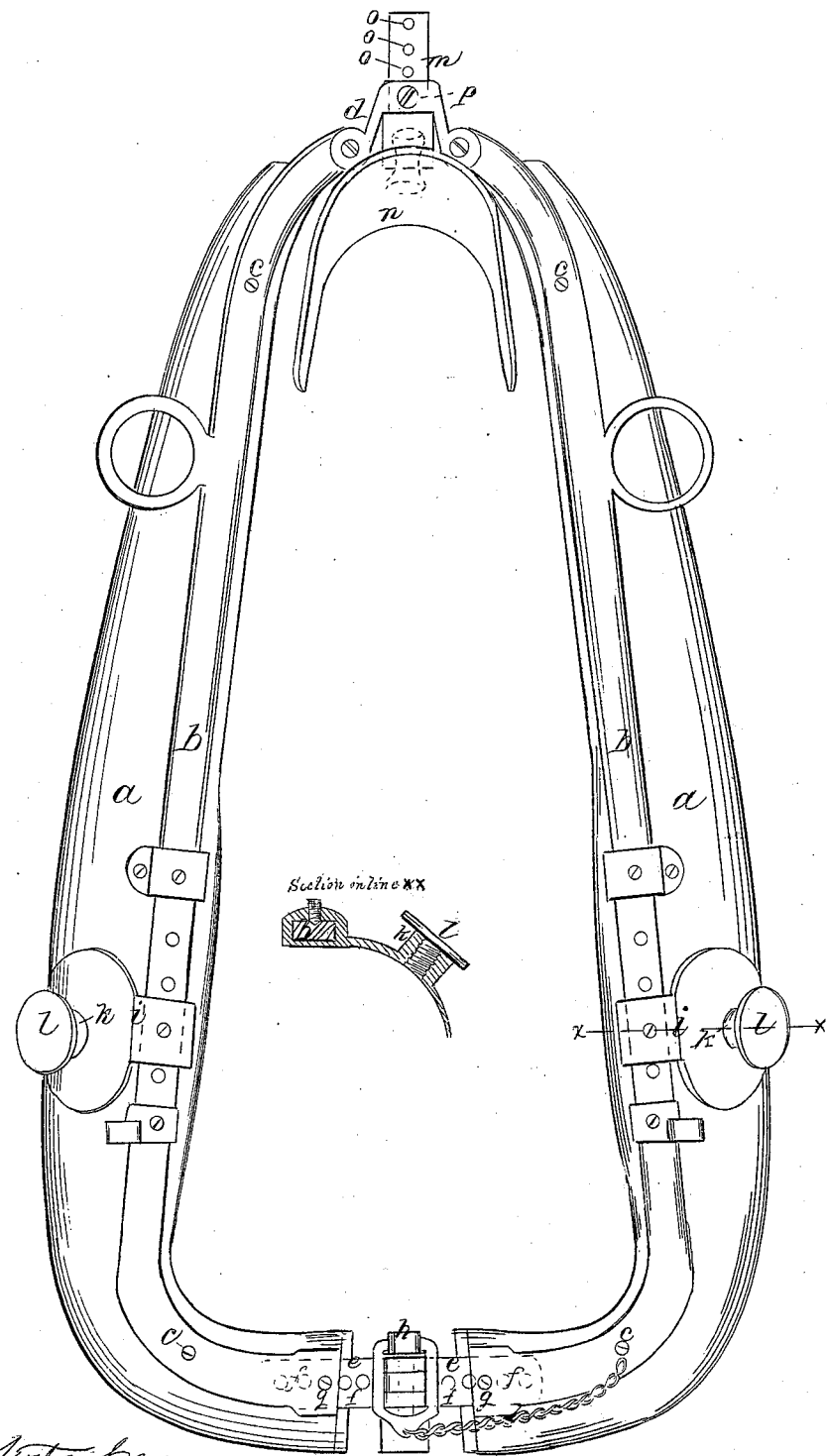

EZRA WILDER, OF SOUTH HINGHAM, MASSACHUSETTS.

Letters Patent No. 93,262, dated August 3, 1869.

IMPROVED HORSE-COLLAR AND HAMES.

The Schedule referred to in these Letters Patent and making part of the same.

*To all whom it may concern:*

Be it known that I, EZRA WILDER, of South Hingham, in the county of Plymouth, and State of Massachusetts, have invented an Improvement in Horse-Collars and Hames; and I do hereby declare that the following, taken in connection with the drawings which accompany and form part of this specification, is a description of my invention, sufficient to enable those skilled in the art to practise it.

United States Letters Patent, No. 73,149, were granted me, January 7, 1868, for certain improvements in carriage-harnesses, the improvement relating particularly to horse-collar hames.

My present improvements have particular reference to horse-collars, or to combined hames and collars; and The invention consists, primarily, in making the collar in two parts, permanently secured to the two bars of a pair of hames, (one to each bar,) said hames-bars being jointed at top, and being connected at bottom by a bolt passing through ears in two adjustable slide-pieces, which pieces admit of the extension or contraction of the collar, as may be required, to adapt it to different horses.

The invention also consists in the employment of tug-pins, (preferably adjustable in position,) having removable caps, for confinement and detachment of the tugs.

Also, in combination with the collar, a swivelling neck-piece, which piece may be made adjustable, for lengthening or shortening the collar.

The drawing represents a combined hames and collar embodying my invention.

$a\ a$ denote the two sides or body-parts of the collar.

$b\ b$, the hames-bars, each bar, $b$, being permanently attached to the adjacent part $a$ by screws $c$, or other suitable fastening-devices.

Each part $b$ is made separate from the other, (except in that both are connected by means of the hames,) but the two hames-bars are jointed at their upper ends to a yoke, $d$, as seen in the drawing.

The lower end of each hames-bar is made with a socket, into which slides a tongue-piece, $e$, provided with a series of holes, $f$, for reception of a screw or pin, $g$, passing through the hames.

The adjacent ends of the two tongue-pieces $e$ are made with ears or projections which interlock, and have, passing through them, a pin, $h$, which bolts the lower ends of the collar and hames-pieces together, removal of the pin permitting the lower ends of the collar and hames-pieces to be separated.

For varying the width of the open-collar space as may be required for different horses, the pin $g$ may be removed, and each tongue-piece slid in or out, until the required space is obtained, when the screw-pins are again screwed in, passing through the holes in line with them.

The tug-pieces $i$ slide upon the hames-bars, as shown in my aforesaid patent.

Each tug-pin or shank, $k$, has a screw-threaded socket, into which passes a screw which carries a button or head, $l$. By removing the screw, the pin $k$ may be slipped through the hole in the tug, and by then replacing the screw, the head or button $l$ secures the tug to the pin, so that it cannot be accidentally displaced.

Passing through the centre of the yoke $d$ is a shank-piece, $m$, to the foot of which is attached a neck-piece, $n$, for resting upon the neck of the horse.

The neck-piece is jointed to the shank by a universal joint, or a joint that permits the neck-piece to swing relatively to the collar, in either direction, thereby preventing the collar from chafing the neck of the horse.

This neck-piece may be padded, and it is preferably made adjustable as to position, by making the shank-piece to slide in the yoke, and providing the shank with a series of holes, $o$, into any one of which the screw $p$ may enter, to fix the pad in position, as will be readily understood.

This collar is intended, principally, for cart, wagon, horse-car, or other heavy-draught horses, and I prefer to make each part $b$ of wood, on account both of its endurance and its cheapness, preferably using for the purpose light and soft wood.

It will be obvious that a collar, made as shown and described, is capable of use with different horses, being easily and quickly fitted to any horse. The adjustments being very simple, the construction is not expensive, does not detract from the good appearance of this part of a harness, and is very easy to the neck of a horse.

I claim, a horse-collar made in two parts, fastened to the two bars of the hames, said hames-bars being jointed at top, and being connected at bottom by an adjustable connector, substantially as shown and described.

Also, in combination with hames-bars constructed as described, collar-pieces made of wood.

Also, in combination with a collar or hames, the neck-piece $n$, arranged to vibrate with a universal movement, substantially as described.

Also, in combination with a collar or hames, the adjustable neck-piece $n$, substantially as described.

Also, in combination with the tug-pieces $i$, the removable or screw-spindled caps $l$, substantially as described.

EZRA WILDER.

Witnesses:
J. B. CROSBY,
FRANCIS GOULD.